UNITED STATES PATENT OFFICE 2,678,317

N - BENZHYDRYLTROPYLAMINE COMPOUNDS AND PROCEDURE FOR PREPARING THE SAME

George B. Payne, Albany, Calif., and Karl Pfister, III, Westfield, N. J., assignors to Merck & Co., Inc., Rahway, N. J., a corporation of New Jersey No Drawing. Application January 22, 1953, Serial No. 332,762

21 Claims. (Cl. 260—292)

This invention relates to new chemical compounds possessing antispasmodic, antihistaminic and mydriatic properties and to procedures for preparing the same. More particularly the invention relates to the new secondary amine N-benzhydryltropylamine, and to certain derivatives and salts thereof including in particular quaternary ammonium salts of said amine and its derivatives, and to procedures employed in preparing these new substances.

The common nucleus of the series of the new substances herein disclosed is the secondary amine N-benzhydryltropylamine which has the structure

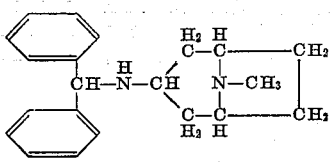

This secondary amine and certain derivatives thereof which are substituted in the 4 position of one benzene ring, as well as salts of the amine and its derivatives, and particularly the quaternary ammonium salts, have been found by pharmacological tests to possess unusual physiological activity. To a varying extent these substances possess antispasmodic activity similar to atropine sulfate, and some of the new substances, as for example N - benzhydryltropylamine-dimethylsulfate, appear to be more potent antispasmodics than atropine sulfate, as well as having strong antihistaminic activity. The mono-oxalate and binoxalate salts have antispasmodic and mydriatic activity approximating that of atropine sulfate.

The salts may be considered the preferred products since they can be prepared in solid and generally crystalline form whereas the free base is normally obtained as an oily liquid. The free amine can be crystallized as a hemihydrate, but the water of crystallization is quite readily given off, as by drying in vacuo, to again form the oily free amine.

The new products in accordance with our invention are prepared by the reductive condensation of tropinone

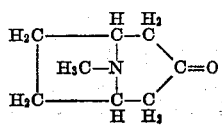

and benzhydrylamine or 4-substituted benzhydrylamine of the formula

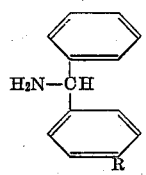

wherein R is selected from the group consisting of hydrogen, halogen, and lower alkyl radicals, the benzhydrylamine compound preferably being in the form of an acid salt such as the hydrochloride.

This reductive condensation is carried out in an anhydrous solvent such as absolute methanol, ethanol, or isopropanol under hydrogen pressure and in the presence of a hydrogenation catalyst such as platinum, platinum oxide, Raney nickel, copper chromite or the like. Hydrogen pressure up to about 50 pounds per square inch can be employed and very good results have been obtained with pressures within the range of 20–40 pounds per square inch. In this connection it should be noted that the condensation can be carried out in a hydrogen atmosphere at atmospheric pressure, but only at the expense of longer reaction time and reduced yield.

In the reaction there is a tendency for some reduction of tropinone to tropinol as a competing side reaction; and it is therefore advisable to use an excess of the ketone. An excess of about 30% gives satisfactory results; and a larger excess, although not necessary, does not impair the yield of the desired secondary amine. Since the reaction time will vary depending on the amount and activity of catalyst, it is preferable to allow the condensation to proceed until hydrogen consumption ceases. From the standpoint of activity per unit weight the preferred catalyst is platinum oxide; and with this catalyst the reaction time may be as much as 72 hours if the amount of catalyst used, relative to the amount of ketone, is about 0.2% by weight, or as little as 15–20 hours if the amount of catalyst is increased to about 2.0% by weight.

It is important to provide and maintain anhydrous conditions during the condensation since the presence of even small amounts of water appear to favor ketone reduction rather than condensation. Furthermore, with anhydrous lower aliphatic alcohols, and particularly with anhydrous ethanol, as the condensation medium recovery of the condensation products is facilitated by their solubility in the medium.

While our condensation may be considered to resemble in a general way simpler reactions variously known as reductive condensation, reductive amination, or reductive alkylation reactions, it is significant to note that in our condensation of the ketone and primary amine it is essential that the ketone group must be part of the starting tropyl compound. Attempts to condense tropyl amine with benzophenone have failed to yield the desired secondary amine.

After completion of the condensation the secondary amine can be recovered in crude form by filtering off the catalyst and concentrating the alcoholic solution to a residue under vacuum and with heating, as for example on a steam bath. This residue is dissolved in water acidified with hydrochloric acid and after filtering off any solid which separates the solution is treated with a base and extracted with ether. After drying, the ether solution can be concentrated to an oily residue of secondary amine containing some of the unreacted primary amine; or alternatingly can be employed directly for preparing various acid salts of the secondary amine. Purification is preferably effected by converting the secondary amine to an acid salt, recrystallizing the acid salt until pure, and then regenerating the pure base therefrom. In this connection the various salts are conveniently formed by addition of the particular acid or acidic reagent to an ethanol solution of the free base.

The following examples will serve to indicate how a number of our new N-benzhydryltropylamine compounds can be prepared, but it is to be understood that these examples are given by way of illustration and not of limitation:

EXAMPLE I

N-benzhydryltropylamine perchlorate

Benzhydrylamine hydrochloride was prepared from benzophenone oxime by the procedure of Jones and Hurd, J. A. C. S. 43, 2438 (1921). Tropinone was recrystallized from petroleum ether and stored under nitrogen in the refrigerator prior to use.

The reductive condensation was carried out by adding 25 mg. of $PtO_1$ to a solution of 11.0 g. (0.05 M) of benzhydrylamine hydrochloride and 9.0 g. (0.065 M) of tropinone in 50 ml. of absolute ethanol, and shaking with hydrogen at room temperature and 30 pounds pressure. The hydrogen uptake was slow, and two additional portions of catalyst (50 mg. and 100 mg.) were added after about 24 hours and 48 hours. On the third day, hydrogen uptake ceased. The catalyst was removed by filtration and the alcoholic solution concentrated to a residue in vacuo on the steam bath. Water was added and the solution made acid to Congo with dilute hydrochloric acid. The solution was extracted with 50 ml. of ether and then basified with excess $K_2CO_3$ to liberate an oily product. This was taken up in ether, the ethereal solution washed with water, dried over $K_2CO_3$ and concentrated to an oily residue of N-benzhydryltropylamine and benzhydrylamine.

The solid perchlorate salt of N-benzhydryltropylamine was obtained by treating an ethereal solution of the oil residue with 1 N alcoholic perchloric acid (added dropwise until acid to Congo). Recrystallization from ethanol-ether gave purified perchlorate salt melting at 242–4° C.

EXAMPLE II

N-benzhydryltropylamine oxalate

The more water-soluble mono-oxalate salt was prepared by dissolving the free base (regenerated from purified perchlorate) in ether and adding alcoholic oxalic acid until acid to Congo paper. It was recrystallized from isopropanol by the addition of a small amount of methanol to a refluxing isopropanol solution, M. P., ca. 120° C.

The addition of excess alcoholic oxalic acid to an ethereal solution of the free base resulted in the formation of the binoxalate salt, M. P. 152–4° C.

EXAMPLE III

N-benzhydryltropylamine

Twenty grams of tropinone and twenty-five grams of benzhydrylamine hydrochloride were added to 150 ml. of absolute ethanol. Five hundred milligrams of $PtO_2$ was added to the resulting suspension and the condensation carried out by shaking the mixture at room temperature under about 35 pounds hydrogen pressure. Hydrogen uptake was negligible after 16 hours, and the reaction was stopped at the end of 20 hours. The catalyst was removed and the solution concentrated in vacuo to a residue. Water was added to the residue, followed by hydrochloric acid to a pH 2–3. The solution was cooled, and the precipitate removed. The filtrate was made basic with sodium hydroxide, and extracted with ether. The ether extract was backwashed with water and concentrated in vacuo to a residue of N-benzhydryltropylamine. The residue was dissolved in 20 ml. of ethanol and a solution of 14 g. of oxalic acid in 40 ml. of absolute ethanol added. On cooling the alcoholic solution, crystalline N-benzhydryltropylamine binoxalate was obtained, M. P. 146–149° C. This was recrystallized from 520 ml. of absolute ethanol to yield N-benzhydryltropylamine binoxalate, M. P. 149–153° C.

EXAMPLE IV

N-benzhydryltropylamine dimethylsulfate

Seventeen grams of N-benzhydryltropylamine binoxalate were converted to the free base. It was extracted with ether, and the ether then removed in vacuo to give a residual oil. Eight grams of the oil were dissolved in 80 ml. of ether and 4 ml. dimethylsulfate added. A voluminous precipitate formed immediately. After standing one hour at room temperature, the solid salt was removed by filtration. Recrystallization from 45 ml. of absolute alcohol yielded the crystalline quaternary salt, M. P. 193–195° C.

EXAMPLE V

N-benzhydryltropylamine methiodide

Addition of methyl iodide to an ethereal solution of the free base, regenerated from the oxalate salt, resulted in the formation of the difficulty soluble N-benzhydryltropylamine methiodide, M. P. 253–8° C.

EXAMPLE VI

N-benzhydryltropylamine hemihydrate

An aqueous solution of N-benzhydryltropylamine binoxalate was made basic with sodium hydroxide and the free N-benzhydryltropylamine extracted into ether. The ether solution was dried and the ether then allowed to evaporate in a watch glass. The resulting oil, when rubbed, crystallized. It was recrystallized from petroleum ether. The crystals that separated softened at 58° C. and melted at 62–64° C. When the crystalline solid was dried in vacuo, the water of hydration was lost and the solid turned to an oil.

EXAMPLE VII

N-benzhydryltropylamine metho-nitrate

To 1.2 g. of N-benzhydryltropylamine in 3 ml. of ether was added 1.5 ml. of methyl nitrate. A clear solution resulted but within five minutes crystallization had begun. After standing at room temperature overnight the solid was removed by filtration and recrystallized from 7 ml. of absolute ethanol by the addition of 1 ml. of ether. It was recrystallized again from 15 ml. of absolute ethanol by the addition of 1 ml. of ether. The melting point of pure metho-nitrate salt was 203–204°.

EXAMPLE VIII

N-benzhydryltropylamine dihydrobromide

To 200 mg. of N-benzhydryltropylamine in 10 ml. of ether was added a solution of hydrogen bromide in absolute ethanol. An immediate precipitate resulted. The solid dihydrobromide was recrystallized from 15 ml. of absolute ethanol, M. P. 252–254° dec.

EXAMPLE IX

N-benzhydryltropylamine ethyliodide

To 200 mg. of N-benzhydryltropylamine in 10 ml. of ether was added 0.5 ml. of ethyl iodide. The solution was then evaporated to dryness on the steam bath. The residue was crystallized twice from absolute ethanol by the addition of ether. The melting point of the ethyl iodide salt was 249–250° C.

EXAMPLE X

N-(4-chlorobenzhydryl)-tropylamine oxalate

A mixture consisting of 16 g. of tropinone, 25.4 g. of 4-chlorobenzhydrylamine hydrochloride, 200 ml. of ethanol and 0.5 g. of platinum oxide was hydrogenated at room temperature at 40 pounds pressure. After twenty-one hours the theoretical amount of hydrogen had been absorbed. The catalyst was removed by filtration and the solvents removed in vacuo. The residue was dissolved in 75 ml. of 2.5 N-hydrochloric acid. Crystallization occurred and after four hours the solid was removed by filtration. The solid weighed 16 g. and was essentially unchanged 4-chlorobenzhydryl amine hydrochloride. The filtrate was made basic with sodium hydroxide and then extracted several times with ether. The combined ether extracts were washed with water, and dried. The dried ether solution (about 200 ml.) was then added to a solution of 7 g. of oxalic acid in 50 ml. of ethanol. A gummy precipitate formed. After decanting the supernatant liquid and washing the residue with more ether the precipitate solidified. This solid was dissolved in 40 ml. of absolute ethanol and 5 ml. of anhydrous ether added. After standing at room temperature for forty-eight hours the crystalline precipitate was removed by filtration to give N-(4-chlorobenzhydryl)-tropylamine binoxalate. On recrystallization from absolute ethanol the product had M. P. 102–104° C.

EXAMPLE XI

N-(4-chlorobenzhydryl)-tropylamine dimethyl sulfate

A solution of 3 g. of N-(4-chlorobenzhydryl)-tropylamine binoxalate in water was made alkaline by addition of sodium hydroxide solution. The mixture was extracted with ether and the ether washed with water and dried. Dimethyl sulfate was added to the ethereal extract. An oil formed which solidified upon scratching. The solid (2 g.) was separated by filtration and recrystallized from alcohol-ether to N-(4-chlorobenzhydryl)-tropylamine dimethylsulfate, M. P. 193–194° C.

EXAMPLE XII

N-(4-methylbenzhydryl)-tropylamine hydrochloride

A mixture of 16.0 g. (0.115 mole) of tropinone and 23.4 g. (0.10 mole) of phenyl-p-tolylmethylamine hydrochloride was dissolved in 200 ml. of ethanol. This was hydrogenated for 20 hours at room temperature using 0.5 g. of platinum oxide catalyst. The calculated hydrogen pressure drop was 23.8 lbs., and the observed was 25.5 lbs.

The catalyst was then filtered off and the ethanol was removed in vacuo. To the residue was added 60 ml. of 2.5 N hydrochloric acid, which caused formation of a precipitate. This solid was collected. It weighed 17.7 g., melting point 240° C. (dec.). It was essentially all phenyl-p-tolylmethylamine hydrochloride.

Upon allowing the filtrate to stand, an oil formed which gradually solidified. This solid was extracted 3 times with ether to remove any tropinone or tropine present. The residue was recrystallized several times from water to give the hydrate of N-(4-methylbenzhydryl)-tropylamine hydrochloride, melting point 175–177°. An anhydrous product was obtained by recrystallizing the material from a mixture of ethanol and ethyl ester.

Various changes and modifications in the foregoing procedures will occur to those skilled in the art, and to the extent that such changes and modifications are embraced by the appended claims, it is to be understood that they constitute part of our invention.

We claim:

1. The process for preparing N-benzhydryltropylamine compounds, wherein the 4-carbon of one benzene ring carries a substituent selected from the group consisting of hydrogen, halogen and lower alkyl radicals, that comprises condensing tropinone and a benzhydrylamine compound wherein the 4-carbon of one benzene ring carries a substituent of the class described under anhydrous conditions in the presence of hydrogen and a hydrogenation catalyst.

2. The process as defined in claim 1 wherein the quantity of tropinone employed in the reaction exceeds the stoichiometric amount required by as much as about 30%.

3. The process as defined in claim 1 wherein the hydrogen pressure during the condensation is as high as about 50 pounds per square inch.

4. The process as defined in claim 1 wherein the hydrogen pressure during the condensation is within the range of about 20 to 40 pounds per square inch.

5. The process as defined in claim 1 wherein the hydrogenation catalyst is employed in the amount of about 0.2 to 2.0% based upon the weight of tropinone present.

6. The process as defined in claim 1 wherein the benzhydrylamine compound employed in the condensation is in the form of an acid salt.

7. The process for preparing N-benzhydryltropylamine that comprises condensing tropinone and an acid salt of benzhydrylamine under anhydrous conditions in the presence of hydrogen and a hydrogenation catalyst.

8. The process for preparing N-(4-chlorobenzhydryl)-tropylamine that comprises condensing tropinone and an acid salt of 4-chlorobenzhydrylamine under anhydrous conditions in the presence of hydrogen and a hydrogenation catalyst.

9. The process for preparing N-(4-methylbenzhydryl)-tropylamine that comprises condensing tropinone and an acid salt phenyl-p-tolylmethylamine under anhydrous conditions in the presence of hydrogen and a hydrogenation catalyst.

10. A substance selected from the class consisting of N-benzhydryltropylamine compounds wherein the 4-carbon of one benzene ring carries a substituent selected from the group consisting of hydrogen, halogen, and lower alkyl radicals, and salts of said compounds.

11. N-benzhydryltropylamine.

12. An acid salt of N-benzhydryltropylamine.

13. An oxalate salt of N-benzhydryltropylamine.

14. A quaternary salt of N-benzhydryltropylamine.

15. N-benzhydryltropylamine dimethylsulfate.

16. N - (4 - lower alkyl - benzhydryl) - tropylamine.

17. An acid salt of N-(4-lower alkyl-benzhydryl)-tropylamine.

18. N-(4-methylbenzhydryl)-tropylamine hydrochloride.

19. N-(4-halobenzhydryl)-tropylamine.

20. An acid salt of N-(4-halobenzhydryl)-tropylamine.

21. N - (4 - chlorobenzhydryl)-tropylamine dimethylsulfate.

No references cited.